United States Patent
Murodate et al.

(10) Patent No.: US 8,767,280 B2
(45) Date of Patent: Jul. 1, 2014

(54) OPTICAL SCANNING DEVICE

(75) Inventors: Yusuke Murodate, Nagoya (JP); Naoyuki Iwata, Kakamigahara (JP)

(73) Assignee: Brother Kogyo Kabushiki Kaisha, Nagoya-Shi, Aichi-Ken (JP)

(*) Notice: Subject to any disclaimer, the term of this patent is extended or adjusted under 35 U.S.C. 154(b) by 275 days.

(21) Appl. No.: 13/407,392

(22) Filed: Feb. 28, 2012

(65) Prior Publication Data

US 2012/0250131 A1     Oct. 4, 2012

(30) Foreign Application Priority Data

Mar. 28, 2011 (JP) .................................. 2011-069546

(51) Int. Cl.
  *G02B 26/08* (2006.01)
  *G02B 26/12* (2006.01)
  *B41J 2/47* (2006.01)

(52) U.S. Cl.
  CPC .............. *G02B 26/12* (2013.01); *G02B 26/121* (2013.01); *B41J 2/471* (2013.01)
  USPC ....................................... 359/216.1; 347/261

(58) Field of Classification Search
  CPC .. G02B 26/121; G02B 26/123; G02B 26/124; B41J 2/471
  USPC .................... 359/216.1–219.2; 347/242–243, 347/257–261
  See application file for complete search history.

(56) References Cited

U.S. PATENT DOCUMENTS

| | | | | |
|---|---|---|---|---|
| 8,564,868 | B2 * | 10/2013 | Kusuda et al. | 359/196.1 |
| 2006/0187513 | A1 | 8/2006 | Ohsugi | |
| 2009/0074462 | A1 | 3/2009 | Yamazaki | |
| 2009/0091813 | A1 * | 4/2009 | Kojima | 359/217.3 |

FOREIGN PATENT DOCUMENTS

| | | |
|---|---|---|
| JP | 2006-234977 A | 9/2006 |
| JP | 2009-066987 A | 4/2009 |

* cited by examiner

*Primary Examiner* — James Phan
(74) *Attorney, Agent, or Firm* — Merchant & Gould P.C.

(57) ABSTRACT

An optical scanning device including: a light source part that is provided in a resin-molded casing and emits a laser beam; a deflector that is arranged in the casing and deflects and scans the laser beam, the deflector including, a rotary polygon mirror that reflects the laser beam, a driving source that rotates the rotary polygon mirror, and a substrate member; and the casing including, a fixed wall that extends in a direction perpendicular to a mirror surface of the rotary polygon mirror, a first fixing part that is provided to the fixed wall and fixes the light source part, a second fixing part that is provided to the fixed wall and fixes the substrate member, and a reinforcing part that is provided to the fixed wall and extends toward the emission direction so as to continuously connect the first fixing part and the second fixing part.

13 Claims, 7 Drawing Sheets

FIG.4
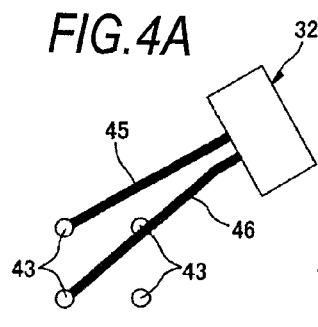
FIG.4A
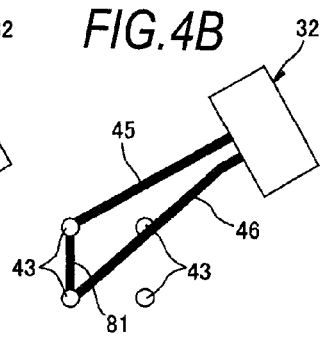
FIG.4B
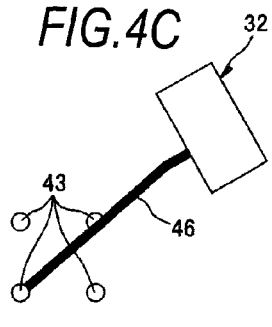
FIG.4C
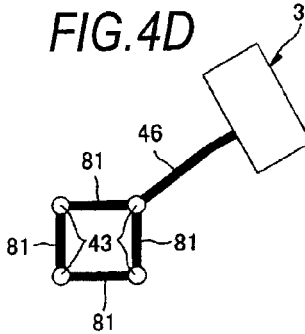
FIG.4D
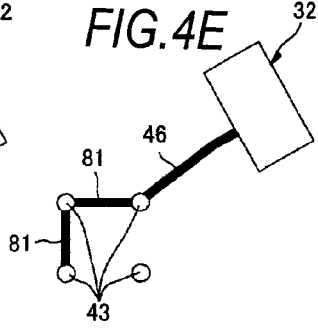
FIG.4E
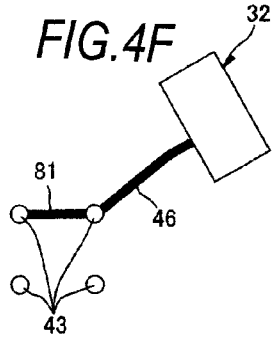
FIG.4F
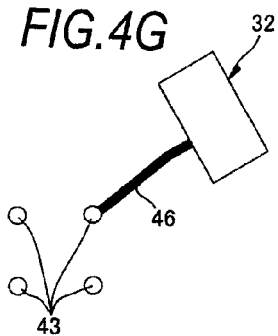
FIG.4G

FIG.7

OPTICAL SCANNING DEVICE

CROSS-REFERENCE TO RELATED APPLICATIONS

This application claims priority from Japanese Patent Application No. 2011-069546 filed on Mar. 28, 2011, the entire contents of which are incorporated herein by reference.

TECHNICAL FIELD

Aspects of the invention relate to an optical scanning device that is used in an image forming apparatus such as laser printer.

BACKGROUND

As a printer of an electrophotographic type, there is known a printer including a photosensitive member on which an electrostatic latent image is formed and an exposure device that forms an electrostatic latent image on a surface of the photosensitive member by scanning laser beam based on image data to the photosensitive member.

As the exposure device provided to the printer, related-art shows an optical scanning device which has a light source unit that emits a light beam, a polygon scanner that deflects and scans the light beam emitted from the light source unit and an optical box that accommodates therein the light source unit and the polygon scanner.

In the related-art optical scanning device, both the light source unit and the polygon scanner are fixed to a bottom face part of the optical box. Also, the bottom face part is provided with ribs that surround the polygon scanner.

SUMMARY

In the related-art optical scanning device, when the polygon scanner rotates at high speed, a resonance, which changes a relative position between the light source unit and the polygon scanner, may be generated by vibrations caused due to the rotation of the polygon scanner.

When the relative position between the light source unit and the polygon scanner is changed by the resonance, the precision of the light beam emitted onto a surface of the photosensitive member is lowered and an image quality of a printed image may be deteriorated.

Accordingly, an object of the invention is to provide an optical scanning device capable of suppressing an image quality of a printed image from being deteriorated.

According to an aspect of the invention, there is provided an optical scanning device including: a light source part that is provided in a resin-molded casing and emits a laser beam; a deflector that is arranged in the casing downstream of the light source part with respect to an emission direction of the laser beam and deflects and scans the laser beam, the deflector including, a rotary polygon mirror that reflects the laser beam, a driving source that rotates the rotary polygon mirror, and a substrate member that supports the rotary polygon mirror and the driving source and is fixed to the casing; and the casing including, a fixed wall that extends in a direction perpendicular to a mirror surface of the rotary polygon mirror, a first fixing part that is provided to the fixed wall and fixes the light source part, a second fixing part that is provided to the fixed wall and fixes the substrate member, and a reinforcing part that is provided to the fixed wall and extends toward the emission direction so as to continuously connect the first fixing part and the second fixing part.

According to the invention, the light source part that emits the laser beam is fixed to the first fixing part provided to the fixed wall of the casing, the substrate member of the deflector that deflects and scans the laser beam is fixed to the second fixing part provided to the fixed wall of the casing and the reinforcing part that extends in the emission direction of the laser beam is provided to the fixed wall of the casing so as to continuously connect the first fixing part and the second fixing part.

Accordingly, the fixed wall between the light source part and the deflector is continuously connected and thus reinforced by the reinforcing part extending in the emission direction of the laser beam.

As a result, it is possible to suppress the resonance that changes a relative position between the light source part and the deflector, which is caused due to the rotation of the rotary polygon mirror, and further to suppress an image quality of a printed image from being deteriorated.

BRIEF DESCRIPTION OF DRAWINGS

FIG. 4 illustrates a casing of a scanner unit of each illustrative embodiment, in which, FIG. 4A shows a second illustrative embodiment,
FIG. 4B shows a third illustrative embodiment,
FIG. 4C shows a fourth illustrative embodiment,
FIG. 4D shows a fifth illustrative embodiment,
FIG. 4E shows a sixth illustrative embodiment,
FIG. 4F shows a seventh illustrative embodiment, and
FIG. 4G shows an eighth illustrative embodiment;

FIG. 7 illustrates a casing of a scanner unit of each comparative example, in which.

DETAILED DESCRIPTION

1. Overall Configuration of Laser Printer

Figure 1:
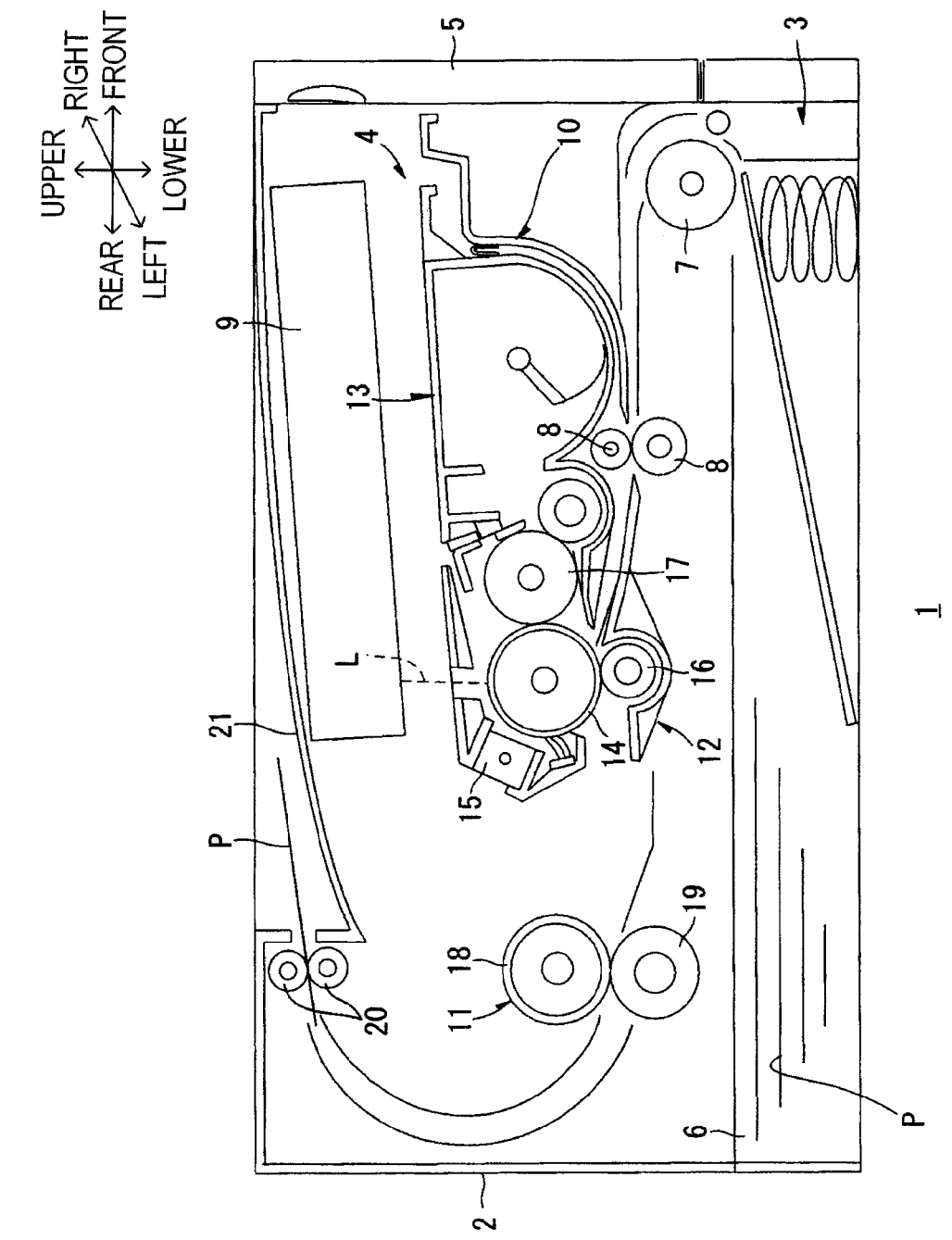
FIG. 1 is a central sectional view of a laser printer.

As shown in FIG. 1, a laser printer 1 has a feeder unit 3 and an image forming unit 4 in a body casing 2.

A front cover 5 for attaching and detaching a developing unit 10 is provided on one sidewall of the body casing 2. The front cover 5 is configured to be opened and closed freely.

Meanwhile, in the descriptions hereinafter, the side (right side of FIG. 1) at which the cover 5 is provided is referred to as the front side and the opposite side (left side of FIG. 1) thereto is referred to as the rear side. Also, the left and right sides are defined when seeing the printer 1 from the front side. That is, the front side in a direction perpendicular to the sheet of FIG. 1 is the left side and the back side in a direction perpendicular to the sheet of FIG. 1 is the right side.

(1) Feeder Unit

The feeder unit 3 has a sheet feeding tray 6 that stacks and accommodates sheets P. The sheet feeding tray 6 is detachably attached to a bottom part in the body casing 2. A sheet feeding roller 7 is arranged upper to the front end of the sheet feeding tray 6 and register rollers 8 are arranged at the rear side of the sheet feeding roller 7.

The sheets P accommodated in the sheet feeding tray 6 are delivered one by one toward the register rollers 8 by rotation of the sheet feeding roller 7. The sheet is then delivered toward the image forming unit 4 (between a photosensitive drum and a transfer roller 16, which will be described later) by rotations of the register rollers 8 at a predetermined timing.

(2) Image Forming Unit

The image forming unit 4 has a scanner unit 9, which is an example of the optical scanning device, a developing unit 10 and a fixing unit 11.

(2-1) Scanner Unit

The scanner unit 9 is arranged at an upper part in the body casing 2. As shown with a dashed line, the scanner unit 9 emits a laser beam L based on image data toward the photosensitive drum 14 (which will be described later) of the developing unit 10 and moves the laser beam L at high speed in one side in left-right direction (main scanning direction), thereby scanning a surface of the photosensitive drum 14.

(2-2) Developing Unit

The developing unit 10 is arranged lower to the scanner unit 9. The developing unit 10 has a drum cartridge 12 and a developing cartridge 13 that is detachably mounted to the drum cartridge 12.

The photosensitive drum 14 that extends in the left-right direction and has a substantially cylindrical shape is rotatably provided in the drum cartridge 12. Also, a scorotron-type charger 15 and a transfer roller 16 are arranged around the photosensitive drum 14 in the drum cartridge 12.

The developing cartridge 13 is arranged at the front side of the photosensitive drum 14 and has a developing roller 17.

The developing roller 17 is rotatably supported to a rear end portion of the developing cartridge 13 so that it is exposed from the back side. The developing roller faces and contacts a front side of the photosensitive drum 14 so as to press the photosensitive drum 14 from the front side.

Also, the developing cartridge 13 accommodates therein toner corresponding to respective colors in a front space of the developing roller 17.

(2-3) Development/Transfer Operations

The toner in the developing cartridge 13 is carried on a surface of the developing roller 17 as the developing roller 17 is rotated.

In the meantime, as the photosensitive drum 14 is rotated, the surface of the photosensitive drum 14 is uniformly charged by the scorotron-type charger 15 and then exposed by the high-speed scanning of the laser beam L (refer to the dashed line in FIG. 1) emitted from the scanner unit 9. Thereby, an electrostatic latent image, which corresponds to an image to be formed on the sheet P, is formed on the surface of the photosensitive drum 14.

When the photosensitive drum 14 is further rotated, the toner carried on the surface of the developing roller 17 is supplied to the electrostatic latent image formed on the surface of the photosensitive drum 14. Thereby, the electrostatic latent image of the photosensitive drum 14 becomes a visible image and a toner image by reversal developing is carried on the surface of the photosensitive drum 14.

The toner image is transferred onto the sheet P that is conveyed (to a transfer position) between the photosensitive drum 14 and the transfer roller 16.

(2-4) Fixing Unit

The fixing unit 11 is provided at the rear of the developing unit 10 and has a heating roller 18 and a pressing roller 19 that is pressure-contacted to the heating roller 18.

The toner image transferred onto the sheet P is heated and pressed and thus heat-fixed on the sheet P while the sheet P passes between the heating roller 18 and the pressing roller 19.

(3) Sheet Discharge

The sheet P having the toner image fixed thereon is conveyed toward sheet discharge rollers 20 and is discharged onto a sheet discharge tray 21, which is formed on an upper surface of the body casing 2, by the sheet discharge rollers 20.

2. Details of Scanner Unit (1) Configuration of Scanner Unit

Figure 2:
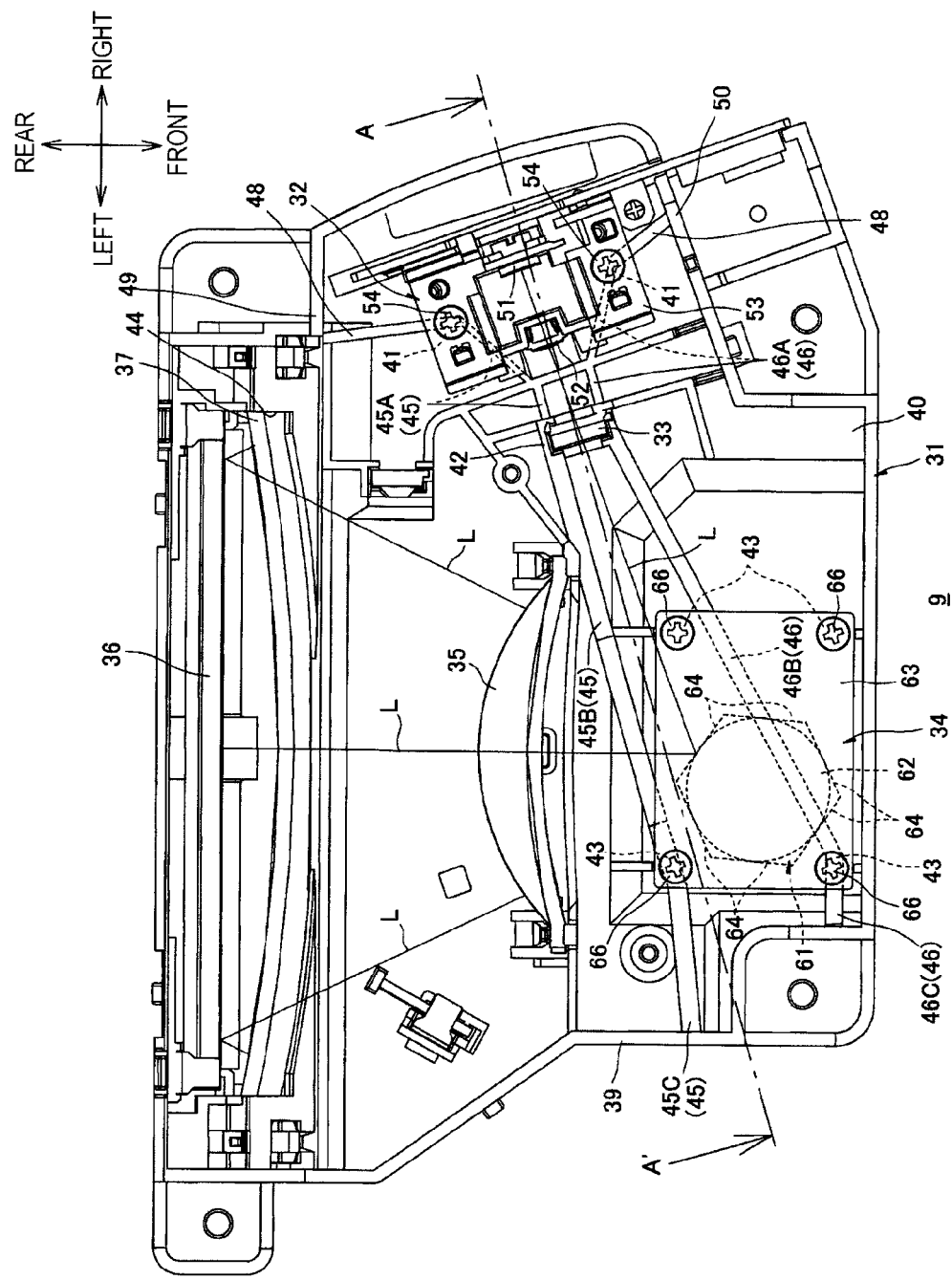
FIG. 2 is a sectional view showing a scanner unit that is a first illustrative embodiment of an optical scanning device of the invention.
Figure 3:
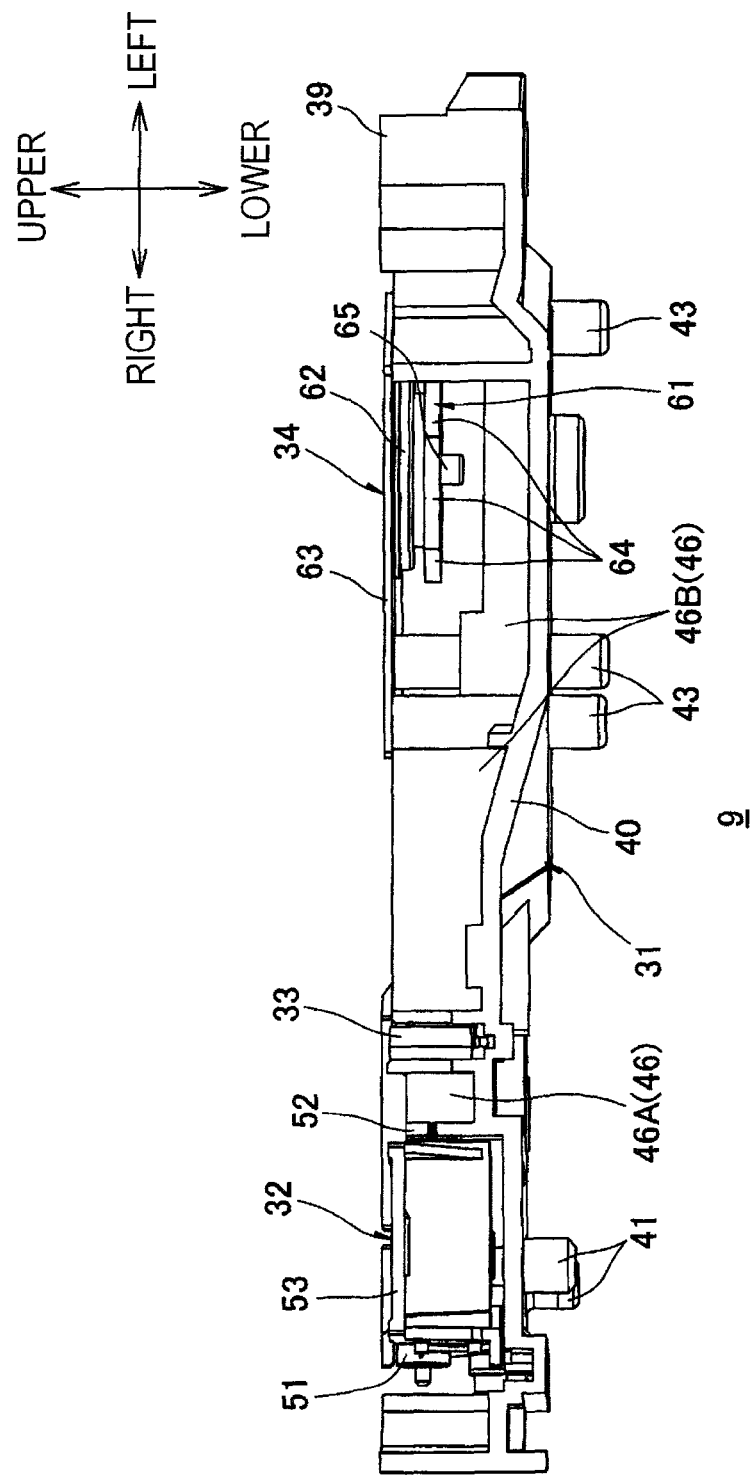
FIG. 3 is an A-A sectional view of the scanner unit shown in FIG. 2.

As shown in FIGS. 2 and 3, the scanner unit 9 has, in a casing 31 made of resin, a light source 32, which is an example of the light source part, a first cylindrical lens 33, a deflector 34, an fθ lens 35, a mirror 36 and a second cylindrical lens 37.

As specifically described later, the casing 31 has a substantially flat box shape that is thin in the upper-lower direction. Specifically, the casing 31 has a lower wall 40 that extends from front to rear and from left to right and is an example of the fixed wall, a sidewall 39 that extends upward from a periphery of the bottom wall 40 and an upper wall (not shown) that is opposed to the lower wall 40 in the upper-lower direction and is connected with the sidewall 39 at a periphery thereof. The lower wall 40 of the casing 31 is formed with a penetrated emission port 44 for emitting the laser beam L toward the photosensitive drum 14.

The emission port 44 has a substantially rectangular shape extending in the left-right direction at a rear end portion of the casing 31, when seen in a plan view.

The light source 32 is disposed at a substantial center of a right end portion of the casing 31 in the front-rear direction. Also, the light source 32 has a light source holder 53, a semiconductor laser 51 and a coupling lens 52.

The light source holder 53 has a substantially rectangular flat plate shape extending from front to rear and from left to right, when seen in a plan view, and is formed at both end portions thereof in the front-rear direction with an insertion penetration hole (not shown) into which a light source fixing screw 54 (which will be described later) is inserted, respectively.

The semiconductor laser 51 is supported at a substantial center of a rear end portion of the light source holder 53 in the front-rear direction. The semiconductor laser 51 emits the laser beam L toward the left side (specifically, toward the left-front side).

The coupling lens 52 is supported at a substantial center of a left end portion of the light source holder 53 in the front-rear direction so that it is opposed to the semiconductor laser 51. The coupling lens 52 converts the laser beam L, which is emitted from the semiconductor laser 51, into a parallel light flux.

The first cylindrical lens 33 has a substantially flat plate shape extending in the front-rear direction (specifically, in a direction connecting the right-front side and the left-rear side) and is arranged with an interval at the left side of the light source 32 so that it is opposed to the coupling lens 52. The first cylindrical lens 33 has refractive power only in a sub-scanning direction (direction perpendicular to both the traveling direction of the laser beam L and the scanning direction of the laser beam L).

The deflector 34 is disposed at the left-front side of the first cylindrical lens 33, in the left-front end portion of the casing 31. The deflector 34 has a motor base plate 63 that is an example of the substrate member, a motor 62 that is an example of the driving source and a polygon mirror 61 that is an example of the rotary polygon mirror.

The motor base plate 63 has a substantially rectangular flat plate shape extending from front to rear and from left to right, when seen in a plan view, and supports the motor 62. Each of four corners of the motor base plate 63 is formed with an insertion penetration hole (not shown) into which a deflector fixing screw 66 (which will be described later) is inserted, respectively.

The motor 62 has a substantially cylindrical shape extending in the upper-lower direction and is fixed on a lower surface of the motor base plate 63. The motor 62 has a driving shaft 65 that extends in the upper-lower direction and can be rotated.

The polygon mirror 61 has a substantially regular hexagonal flat plate shape when seen in a plan view and has a thickness in the upper-lower direction. Each side of the polygon mirror 61 is formed with a mirror surface 64 extending in the upper-lower direction. The polygon mirror 61 is supported, at a substantial center thereof when seen in a plan view, to a lower end portion of the driving shaft 65 of the motor 62 so that it cannot be relatively rotated. Also, the polygon mirror 61 is arranged to face the lower wall 40 of the casing 31 with an interval therebetween in the upper-lower direction.

The fθ lens 35 is a lens having an fθ characteristic, has a substantially flat plate shape extending in the left-right direction. The fθ lens 35 is arranged at a substantial center of the casing 31 in the front-rear direction and at the rear side of the deflector 34 to face the polygon mirror 61. A rear end surface of the fθ lens 35 has a substantially circular arc shape having a predetermined curvature so that a substantial center thereof in the left-right direction protrudes rearward. A front end surface of the fθ lens 35 has a substantially circular arc shape having a curvature smaller than that of the rear end surface so that a substantial center thereof in the left-right direction is concave rearward.

The mirror 36 has a substantially flat plate shape extending in the left-right direction and is disposed at a rear side periphery of the emission port 44 to face the fθ lens 35, in the rear end portion of the casing 31. Also, the mirror 36 has a front face that is a mirror surface and is inclined such that it is directed downward as it is directed toward the rear side, so that the front face is opposed to the emission port 44.

The second cylindrical lens 37 has a substantially flat plate shape extending in the left-right direction and is arranged to face the mirror 36 in the emission port 44. The second cylindrical lens 37 has refractive power only in the sub-scanning direction.

(2) Details of Casing (2-1) Configuration Regarding Fixing of Light Source, First Cylindrical Lens and Deflector In the casing 31, two light source fixing parts 41 for fixing the light source 32, which are an example of the first fixing part, a first cylindrical lens fixing part 42 for fixing the first cylindrical lens 33 and four deflector fixing parts 43 for fixing the deflector 34, which are an example of the second fixing part, are provided.

The respective light source fixing parts 41 are arranged with an interval in the front-rear direction at a substantial center of the right end portion of the casing 31 in the front-rear direction so that the respective light source fixing parts correspond to the respective insertion penetration holes (not shown) of the light source holder 53. Each of the light source fixing parts 41 has a substantially cylindrical shape (refer to FIG. 3) extending and protruding vertically from the lower wall 40 of the casing 31 and has a screw hole (not shown) at a substantially diametrical center thereof, which is formed downward from the upper end surface.

The light source fixing screws 54 inserted into the respective insertion penetration holes (not shown) of the light source holder 53 are screwed into the respective light source fixing parts 41, so that the light source holder 53 of the light source 32 is fixed.

The first cylindrical lens fixing part 42 is arranged at a left side of the front light source fixing part 41 and has a substantially rectangular frame shape extending in the front-rear direction, when seen in a plan view. In the meantime, left and right sidewalls of the first cylindrical lens fixing part 42 are notched at parts through which the laser beam L passes.

The first cylindrical lens 33 is fitted and fixed in the first cylindrical lens fixing part 42.

The respective deflector fixing parts 43 are arranged at the left-front end portion of the casing 31 in two lines of left and right, which are parallel, in the front-rear direction with an interval therebetween, so that they correspond to the respective insertion penetration holes (not shown) of the motor base plate 63. Each of the deflector fixing parts 43 has a substantially cylindrical shape extending and protruding vertically from the lower wall 40 of the casing 31 (refer to FIG. 3) and has a screw hole (not shown) at a substantially diametrical center thereof, which is formed downward from the upper end surface.

The deflector fixing screws 66 inserted into the respective insertion penetration holes (not shown) of the motor base plate 63 are screwed into the respective deflector fixing parts 43, so that the motor base plate 63 of the deflector 34 is fixed.

(2-2) Configuration about Reinforcement of Casing

In the casing 31, a first rib 45 and a second rib 46, which are an example of the reinforcing part, are provided.

The first rib 45 is a protrusion that protrudes upward from the lower wall 40 of the casing 31 and extends in the left-right direction while being curved. The first rib 45 is arranged between the polygon mirror 61 and the fθ lens 35 at the rear side of the light path of the laser beam L so that it follows the laser beam L heading for the polygon mirror 61 from the light source 32.

Specifically, the first rib 45 integrally has a first part 45A, a second part 45B and a third part 45C.

The first part 45A continuously connects the rear light source fixing part 41 and a rear end portion of the first cylindrical lens fixing part 42. Specifically, the first part 45A extends from the rear light source fixing part 41 to the left-front side, is bent leftward at the left side of the coupling lens 52, further extends in the left-front direction and is then connected to the rear end portion of the first cylindrical lens fixing part 42.

The second part 45B continuously connects the rear end portion of the first cylindrical lens fixing part 42 and one of the deflector fixing part 43 which is positioned at the left-rear side. Specifically, the second part 45B has a substantially linear shape extending in a direction of connecting the right-rear side and the left-front side so that it is inclined at an angle smaller than 90 degrees with respect to the laser beam L passing a center of the scanning range of the laser beam L in the left-right direction. Also, the second part 45B is notched downward from the upper end at a left half thereof facing the polygon mirror 61 in the front-rear direction so that it does not interfere with the laser beam L.

The third part 45C has a substantially linear shape extending in the left-right direction so that it continuously connects one of the deflector fixing parts 43, which is located at the left-rear side, and the left sidewall 39 of the casing 31.

The second rib 46 is a protrusion that protrudes upward from the lower wall 40 of the casing 31 and extends in the left-right direction while being curved. The second rib 46 is arranged at the front side of the light path of the laser beam L with an interval between the first rib 45 so that it follows the laser beam L heading for the polygon mirror 61 from the light source 32. That is, when projected in the upper-lower direction, the first rib 45 and the second rib 46 are arranged to sandwich the laser beam L, which is heading for the polygon mirror 61 from the first cylindrical lens 33, in the front-rear direction.

Specifically, the second rib 46 integrally has a first part 46A, a second part 46B and a third part 46C.

The first part 46A continuously connects the front light source fixing part 41 and the front end portion of the first cylindrical lens fixing part 42. Specifically, the first part 46A extends from the front light source fixing part 41 to the left-rear side, is bent leftward at the left-front side of the coupling lens 52, further extends in the left-lower direction and is then connected to the front end portion of the first cylindrical lens fixing part 42.

The second part 46B continuously connects the front end portion of the first cylindrical lens fixing part 42 and one of the deflector fixing part 43 which is positioned at the left-front side (i.e., the deflector fixing part 43 located at the most distant position from the first cylindrical lens fixing part 42). Specifically, the second part 46B of the second rib 46 has a substantially linear shape extending in a direction of connecting the right-rear side and the left-front side so that it is inclined at an angle smaller than 90 degrees with respect to the laser beam L passing a center of the scanning range of the laser beam L in the left-right direction. Also, when projected in the upper-lower direction, a left half of the second part 46B of the second rib 46 extends to cross the front end portion of the polygon mirror 61 in the left-right direction, and is notched downward from the upper end thereof so that it does not interfere with the polygon mirror 61 (refer to FIG. 3).

The third part 46C has a substantially linear shape extending in the left-right direction so that it continuously connects one of the deflector fixing parts 43, which is located at the left-front side, and the left sidewall 39 of the casing 31.

Also, two light source reinforcement ribs 48, which respectively connect the respective light source fixing parts 41 and the right sidewall 39 of the casing 31, are provided in the casing 31.

Specifically, a rear-light source part side plate 49, which is arranged with an interval at the rear side of the light source 32 and extends leftward continuously from the right sidewall 39 of the casing 31, and a front-light source part side plate 50, which is arranged with an interval at the front side of the light source 32 and extends leftward continuously from the right sidewall 39 of the casing 31, are formed in the casing 31.

The front light source reinforcement rib 48 has a substantially linear shape extending in the front-rear direction so that it continuously connects the front light source fixing part 41 and the front-light source part side plate 50. That is, the front light source reinforcement rib 48 is connected to the right sidewall 39 of the casing 31 via the front-light source part side plate 50.

Also, the rear light source reinforcement rib 48 has a substantially linear shape extending in the front-rear direction so that it continuously connects the rear light source fixing part 41 and the rear-light source part side plate 49. That is, the rear light source reinforcement rib 48 is connected to the right sidewall 39 of the casing 31 via the rear-light source part side plate 49.

(3) Operations of Scanner Unit

When the scanner unit 9 is operated, the motor 62 of the deflector 34 is first driven and then the polygon mirror 61 is rotated at high speed.

Then, the laser beam L is emitted from the light source 32 toward the polygon mirror 61 that is being rotated.

When the laser beam L emitted from the light source 32 passes the first cylindrical lens 33, the laser beam is converged in the sub-scanning direction and then enters onto the polygon mirror 61 that is being rotated.

Then, as the laser beam L is reflected from the mirror surface 64 of the polygon mirror 61, the laser beam is deflected to perform equiangular movement and is scanned in the main scanning direction.

The laser beam L scanned by the polygon mirror 61 is converted into a constant speed scanning when passing through the fθ lens 35. Then, the laser beam L is reflected from the mirror 36. After that, the laser beam L passes through the second cylindrical lens 37 and is then illuminated on the surface of the photosensitive drum 14.

3. Operational Effects (1) According to the scanner unit 9, as shown in FIG. 2, the first rib 45 and second rib 46 extending toward the emission direction (the left-front side) of the laser beam L are provided on the lower wall 40 of the casing 31 so as to continuously connect the light source fixing parts 41 provided on the lower wall 40 of the casing 31 and the deflector fixing parts 43 provided on the lower wall 40 of the casing 31.

Therefore, it is possible to continuously connect and reinforce the lower wall 40 between the light source 32 and the deflector 34 by the first rib 45 and second rib 46 extending toward the emission direction of the laser beam L.

As a result, it is possible to suppress the resonance that changes the relative position between the light source 32 and the polygon mirror 61 of the deflector 34, which is due to the vibrations caused due to the rotation of the polygon mirror 61 of the deflector 34. Accordingly, it is possible to suppress the image quality of a printed image from being deteriorated.

(2) According to the scanner unit 9, as shown in FIG. 2, the first rib 45 and second rib 46 extend so that the ribs are inclined at the angle smaller than 90 degrees with respect to the laser beam L passing to a center of the scanning range of the laser beam L in the left-right direction.

Therefore, it is possible to enable the first rib 45 and second rib 46 to follow the laser beam L, which is emitted from the light source part (light source 32 and first cylindrical lens 33) while being inclined in the left-front direction.

As a result, it is possible to further reinforce the lower wall 40 of the casing 31 with respect to the emission direction of the laser beam L.

(3) According to the scanner unit 9, as shown in FIG. 2, the second rib 46 continuously connects the deflector fixing part 43 of the left-front side, which is located at the most distant position from the light source fixing part 41, and the light source fixing part 41.

Therefore, it is possible to make the second rib 46 long in the left-right direction, so that it is possible to further reinforce the lower wall 40 of the casing 31.

(4) According to the scanner unit 9, as shown in FIG. 2, the first rib 45 and the second rib 46 continuously connect the deflector fixing parts 43 and the left sidewall 39 of the casing 31.

Therefore, it is possible to connect the lower wall 40 and the left sidewall 39 of the casing 31 by the first rib 45 and second rib 46.

As a result, it is possible to suppress the resonance that changes the relative position between the light source 32 and the polygon mirror 61 of the deflector 34, which is due to the vibrations caused due to the rotation of the polygon mirror 61 of the deflector 34.

(5) According to the scanner unit 9, as shown in FIG. 2, when projected in the upper-lower direction, the second rib 46 extends to cross the polygon mirror 61 in the left-right direction.

Therefore, it is possible to reinforce the lower wall 40 of the casing 31 at a position at which the second rib overlaps with the polygon mirror 61, when projected in the upper-lower direction.

As a result, it is possible to further suppress the resonance that changes the relative position between the polygon mirror 61 and the light source 32.

(6) According to the scanner unit 9, as shown in FIG. 2, when projected in the upper-lower direction, the first rib 45 and second rib 46 continuously connect the light source fixing parts 41 and the deflector fixing parts 43 of the left-rear and left-front sides, respectively, so as to sandwich the laser beam L heading for the polygon mirror 61 from the light source 32 in the front-rear direction.

Therefore, it is possible to reinforce the lower wall 40 of the casing 31 at both the front and rear sides of the light path of the laser beam L.

As a result, it is possible to further reinforce the lower wall 40 of the casing 31 with respect to the emission direction of the laser beam L.

(7) According to the scanner unit 9, as shown in FIG. 3, the polygon mirror 61 is provided below the motor base plate 63. That is, the motor base plate 63 is provided above the lower wall 40 of the casing 31 with the polygon mirror 61 being interposed therebetween.

Therefore, it is possible to arrange the deflector 34 based on the lengths of the first rib 45 and second rib 46 in the upper-lower direction.

As a result, when the first rib 45 and second rib 46 are formed, it is possible to suppress the scanner unit 9 from becoming larger.

(8) According to the scanner unit 9, as shown in FIG. 2, the light source 32 of the light source part (light source 32 and first cylindrical lens 33) has the semiconductor laser 51 that emits the laser beam L and the coupling lens 52 that converts the laser beam L from the semiconductor laser 51 into the parallel light flux.

Therefore, the first rib 45 and second rib 46 can reinforce the lower wall 40 of the casing 31 between the semiconductor laser 51 and coupling lens 52 and the deflector 34.

As a result, it is possible to suppress the resonance that changes the relative position between the light source 32 of the polygon mirror 61 of the deflector 34, which is due to the vibrations caused due to the rotation of the polygon mirror 61 of the deflector 34.

(9) According to the scanner unit 9, as shown in FIG. 3, the first rib 45 and second rib 46 are protrusions that extend upward from the lower wall 40 of the casing 31.

Therefore, it is possible to reinforce the lower wall 40 of the casing 31 by a simple configuration.

(10) According to the scanner unit 9, as shown in FIG. 3, the respective deflector fixing parts 43 extend vertically from the lower wall 40 of the casing 31 and the motor base plate 63 is screwed to the respective deflector fixing parts 43.

Therefore, it is possible to securely fix the motor base plate 63 to the respective deflector fixing parts 43 with a simple configuration.

(11) According to the scanner unit 9, as shown in FIG. 2, the first part 45A of the first rib 45 and the first part 46A of the second rib 46, which reinforce the lower wall 40 between the light source 32 and the first cylindrical lens 33, are provided in the casing 31.

Therefore, it is possible to further suppress the resonance that changes the relative position between the light source 32 and the polygon mirror 61 of the deflector 34, which is due to the vibrations caused due to the rotation of the polygon mirror 61 of the deflector 34.

As a result, it is possible to further suppress the image quality of the printed image from being deteriorated.

4. Respective Illustrative Embodiments (1) Second to Eighth Illustrative Embodiments Second to eighth illustrative embodiments are described with reference to FIG. 4. In the meantime, FIG. 4 shows only the main parts of FIG. 2. In the second to eighth illustrative embodiments, the same members as those of the first illustrative embodiment are indicated with the same reference numerals and the descriptions thereof are omitted.

In the above-described first illustrative embodiment, the casing 31 is provided with the first rib 45 that connects the light source fixing part 41 and the deflector fixing part 43 of the left-rear side and the second rib 46 that connects the light source fixing part 41 and the deflector fixing part 43 of the left-front side, and the first rib 45 and the second rib 46 are connected to the sidewall 39.

In the second illustrative embodiment, as shown in FIG. 4A, the first rib 45 of the first illustrative embodiment is formed of the first part 45A and the second part 45B and the second rib 46 is formed of the first part 46A and the second part 46B. That is, in the second illustrative embodiment, the first rib 45 and the second rib 46 are not connected to the sidewall 39, differently from the first illustrative embodiment.

Further, in the third illustrative embodiment, as shown in FIG. 4B, a third rib 81 that is an example of the reinforcing part continuously connecting the deflector fixing part 43 of the left-rear side and the deflector fixing part 43 of the left-front side is additionally provided to the configuration of the second illustrative embodiment. The third rib 81 is a protrusion having a substantially linear shape that protrudes upward from the lower wall 40 of the casing 31, when seen in a plan view.

Further, in the fourth illustrative embodiment, as shown in FIG. 4C, only the second rib 46 is provided in comparison to the configuration of the second illustrative embodiment.

Further, in the fifth illustrative embodiment, as shown in FIG. 4D, the second rib 46 is configured to connect the light source fixing part 41 and the deflector fixing part 43 of the right-rear side and the third ribs 81 are configured to connect the deflector fixing parts 43 of the left-rear and left-front sides, the deflector fixing parts 43 of the left-front and right-front sides, the deflector fixing parts 43 of the right-front and right-rear sides and the deflector fixing parts 43 of the right-rear and left-rear sides, respectively.

Further, in the sixth illustrative embodiment, as shown in FIG. 4E, the third ribs 81 of the fifth illustrative embodiment are configured to connect the deflector fixing parts 43 of the left-rear and left-front sides and the deflector fixing parts 43 of the right-rear and left-rear sides, respectively.

Further, in the seventh illustrative embodiment, as shown in FIG. 4F, the first rib 81 of the fifth illustrative embodiment is configured to connect the deflector fixing parts 43 of the right-rear and left-rear sides.

Further, in the eighth illustrative embodiment, as shown in FIG. 4G, only the second rib 46 of the fifth illustrative embodiment is provided.

According to the third and fifth to seventh illustrative embodiments, as shown in FIGS. 4B and 4D to 4F, the third rib 81 continuously connects at least two deflector fixing parts 43.

Accordingly, it is possible to suppress the vibrations of the deflector fixing parts 43 connected to each other and to thus suppress the vibration of the deflector 34 itself.

As a result, it is possible to suppress the resonance that changes the relative position between the light source 32 and the polygon mirror 61 of the deflector 34, which is due to the vibrations caused due to the rotation of the polygon mirror 61 of the deflector 34.

According to the fifth to eighth illustrative embodiments, as shown in FIGS. 4D to 4G, the second rib 46 continuously connects the deflector fixing part 43 of the right-rear side (the deflector fixing part 43 positioned to be closest to the mirror surface 64 of the polygon mirror 61, from which the laser beam L is reflected) and the light source fixing part 41.

Therefore, it is possible to reinforce the lower wall 40 of the casing 31 between the mirror surface 64 of the polygon mirror 61, from which the laser beam L is reflected, and the light source 32.

As a result, it is possible to further suppress the resonance that changes the relative position between the light source 32 and the polygon mirror 61 of the deflector 34, which is due to the vibrations caused due to the rotation of the polygon mirror 61 of the deflector 34.

In addition, in the above respective illustrative embodiments, the same operational effects as those of the first illustrative embodiment can be realized.

(2) Ninth Illustrative Embodiment

Figure 5:
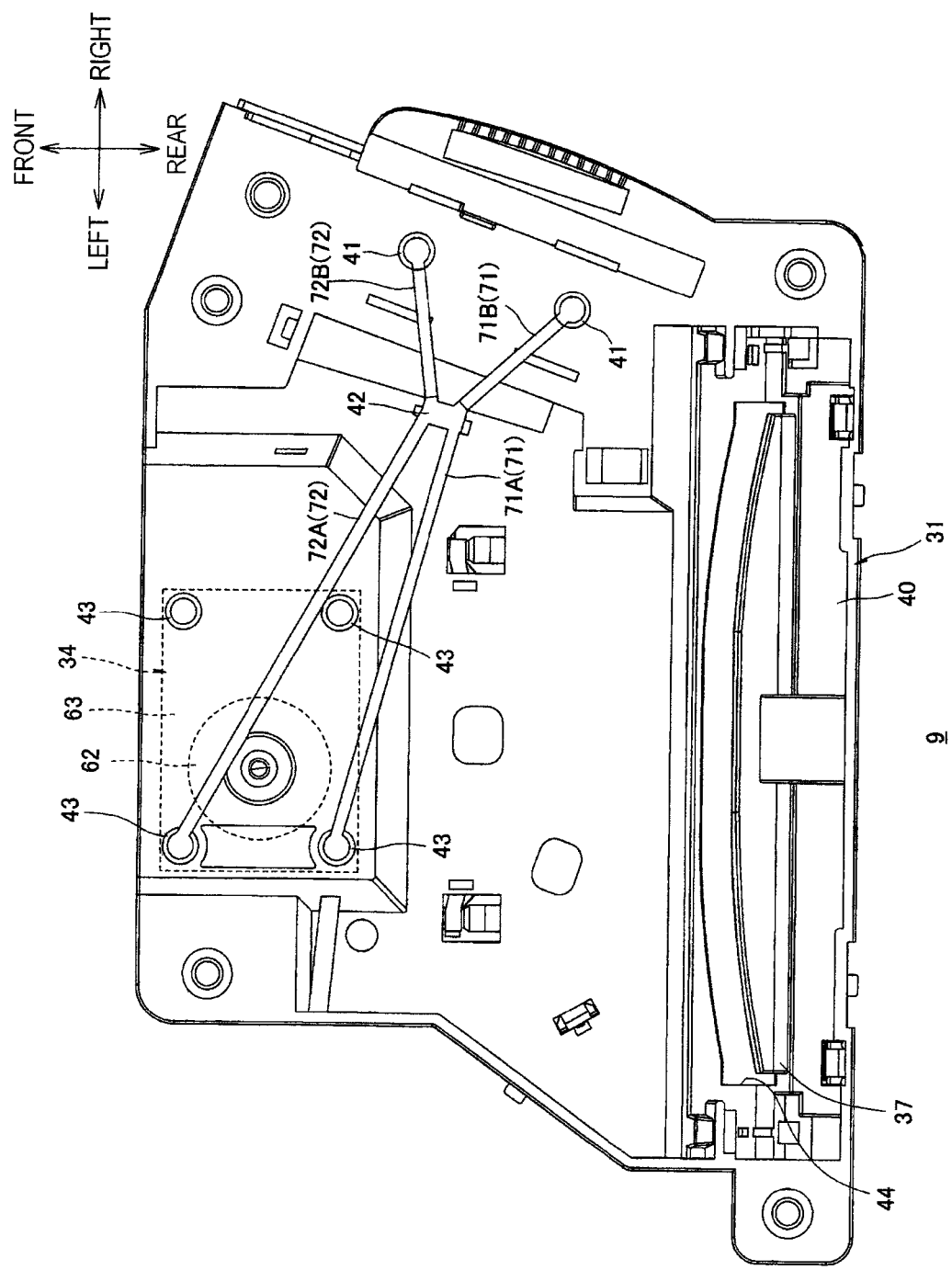
FIG. 5 is a bottom view of a scanner unit that is a ninth illustrative embodiment of the optical scanning device of the invention.
Figure 6:
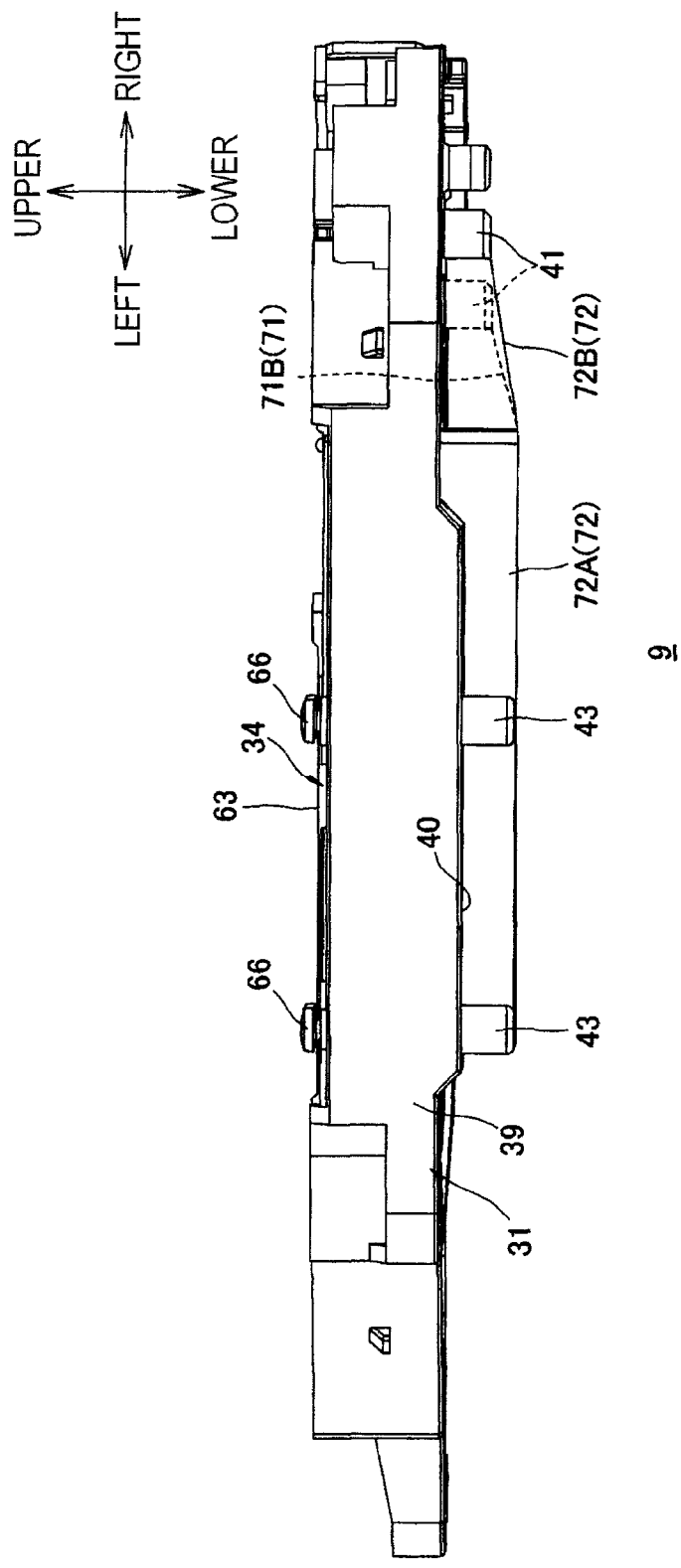
FIG. 6 is a side view of the scanner unit shown in FIG. 5.

A ninth illustrative embodiment is described with reference to FIGS. 5 and 6. Meanwhile, in the ninth illustrative embodiment, the same members as those of the first illustrative embodiment are indicated with the same reference numerals and the descriptions thereof are omitted.

In the first illustrative embodiment, the first rib 45 and second rib 46 are provided to protrude upward from the lower wall 40 of the casing 31. However, in the ninth illustrative embodiment, as shown in FIGS. 5 and 6, a first rib 71 and a second rib 72 are provided to protrude downward from the lower wall 40 of the casing 31.

The first rib 71 is a protrusion having a substantially linear shape that protrudes downward from the lower wall 40 of the casing 31 and extends in the left-right direction, when seen in a plan view, and integrally has a first left rib 71A and a first right rib 71B.

The first left rib 71A continuously connects the lower wall 40 below the first cylindrical lens fixing part 42 and a part of the deflector fixing part 43 of the left-rear side, which protrudes downward.

The first right rib 71B continuously connects the lower wall 40 below the first cylindrical lens fixing part 42 and a part of the rear light source fixing part 41, which protrudes downward.

The second rib 72 is a protrusion having a substantially linear shape that protrudes downward from the lower wall 40 of the casing 31 and extends in the left-right direction, when seen in a plan view, and integrally has a second left rib 72A and a second right rib 72B.

The second left rib 72A continuously connects the lower wall 40 below the first cylindrical lens fixing part 42 and a part of the deflector fixing part 43 of the left-front side, which protrudes downward.

The second right rib 72B continuously connects the lower wall 40 below the first cylindrical lens fixing part 42 and a part of the front light source fixing part 41, which protrudes downward.

According to the ninth illustrative embodiment, it is possible to provide the first rib 71 and second rib 72 on an opposite surface (lower surface) to an upper surface of the lower wall 40 to which the deflector 34 is fixed so that the ribs protrude downward from the lower wall 40 of the casing 31.

Accordingly, it is possible to reinforce the lower wall 40 of the casing 31 while simplifying the configuration of the inside of the casing 31, to which the deflector 34 is fixed, and further freely designing the layout thereof.

Additionally, in the ninth illustrative embodiment, the same operational effects as the first illustrative embodiment can be realized.

EXAMPLES

For the configurations described in the above illustrative embodiments and configurations of comparative examples which are described below, vibration analysis is performed.

1. Comparative Examples (1) Comparative Example 1

Figure 7A:
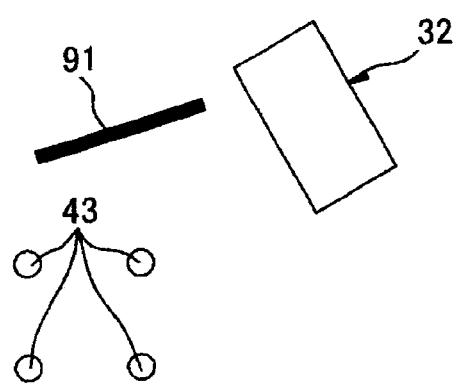
FIG. 7A shows a first comparative example.

As shown in FIG. 7A, a rib 91 that is not continuous to any of the respective light source fixing parts 41 and respective deflector fixing parts 43 is provided at a substantial center of the casing 31, when seen in a plan view.

(2) Comparative Example 2

Figure 7B:
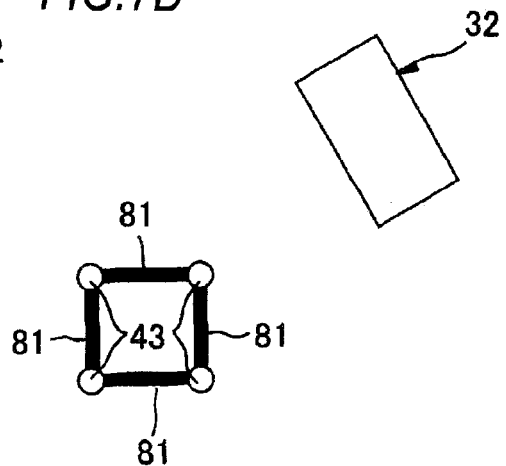
FIG. 7B shows a second comparative example.

As shown in FIG. 7B, only the third ribs 81 of the fifth illustrative embodiment were provided.

(3) Comparative Example 3

Figure 7C:
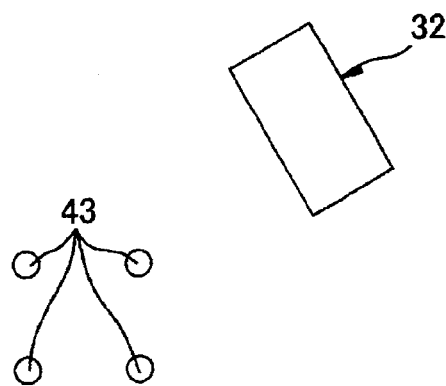
FIG. 7C shows a third comparative example.

As shown in FIG. 7C, a rib was not provided within a range of an angle smaller than 90 degrees with respect to the laser beam L passing to a center of the scanning range of the laser beam L in the left-right direction (that is, a rib that reinforces the casing 31 was not substantially provided).

2. Vibration Analysis (1) Analysis Solver
LS-DYNA R4.2.1
(2) Method
Implicit method, eigenvalue analysis
(3) Material Properties of Casing
Young's modulus: 4380 MPa
Density: 1.0 g/cm$^3$
(4) With the above-described conditions, natural frequencies were analyzed in resonance modes (resonance mode (1) and resonance mode (2)) in which the relative position between the light source 32 and the deflector 34 changes. The analysis results are shown in table 1. Note that, the higher the natural frequency, the higher the rigidity of the casing.

TABLE 1

| | Natural frequencies (Hz) in respective resonance modes | |
|---|---|---|
| | resonance mode (1) | resonance mode (2) |
| First illustrative embodiment | 207.7 | 461.8 |
| Second illustrative embodiment | 179.4 | 439.6 |
| Third illustrative embodiment | 181.1 | 439.7 |
| Fourth illustrative embodiment | 175.9 | 435.0 |
| Fifth illustrative embodiment | 172.3 | 439.0 |
| Sixth illustrative embodiment | 170.0 | 439.7 |
| Seventh illustrative embodiment | 169.0 | 439.4 |
| Eighth illustrative embodiment | 167.0 | 425.7 |
| Comparative example 1 | 170.3 | 430.3 |
| Comparative example 2 | 168.7 | 404.5 |
| Comparative example 3 | 166.0 | 407.6 |

What is claimed is:

1. An optical scanning device comprising:
a light source part that is provided in a resin-molded casing and emits a laser beam;
a deflector that is arranged in the casing downstream of the light source part with respect to an emission direction of the laser beam and deflects and scans the laser beam, the deflector including,
a rotary polygon mirror that reflects the laser beam,
a driving source that is configured to rotate the rotary polygon mirror, and
a substrate member that supports the rotary polygon mirror and the driving source and is fixed to the casing; and
the casing including,
a fixed wall that extends in a direction perpendicular to a mirror surface of the rotary polygon mirror,
a first fixing part that is provided to the fixed wall and fixes the light source part,
a second fixing part that is provided to the fixed wall and fixes the substrate member, and
a reinforcing part that is provided to the fixed wall and extends toward the emission direction so as to continuously connect the first fixing part and the second fixing part.

2. The optical scanning device according to claim 1, wherein the reinforcing part extends so as to be inclined at an angle smaller than 90 degrees with respect to the laser beam passing a center of a scanning range of the laser beam in a scanning direction of the laser beam.

3. The optical scanning device according to claim 1, wherein a plurality of the second fixing parts are provided, and
wherein the reinforcing part continuously connects a second fixing part, which is arranged to be most distant from the light source part, and the first fixing part.

4. The optical scanning device according to claim 1, wherein the casing has a sidewall that is provided at an opposite side to the light source part with the deflector being interposed therebetween and extends perpendicularly from the fixed wall, and
wherein the reinforcing part continuously connects the second fixing part and the sidewall.

5. The optical scanning device according to claim 1, wherein, when projecting the reinforcing part in a direction perpendicular to the extending direction of the fixed wall, the reinforcing part extends to cross the rotary polygon mirror.

6. The optical scanning device according to claim 1, wherein a plurality of the second fixing parts are provided, and
wherein, when projecting the reinforcing part in a direction perpendicular to the extending direction of the fixed wall, the reinforcing part continuously connects the first fixing part and at least two of the plurality of the second fixing parts, respectively, so as to sandwich the laser beam between the rotary polygon mirror and the light source part by the reinforcing part in the extending direction of the fixed wall.

7. The optical scanning device according to claim 1, wherein a plurality of the second fixing parts are provided, and
wherein the reinforcing part continuously connects at least two of the plurality of the second fixing parts.

8. The optical scanning device according to claim 1, wherein a plurality of the second fixing parts are provided, and
wherein the reinforcing part continuously connects a second fixing part, which is arranged to be closest to a mirror surface of the rotary polygon mirror from which the laser beam is reflected, and the first fixing part.

9. The optical scanning device according to claim 1, wherein the reinforcing part is provided on a surface of the fixed wall, which is opposite to a surface on which the deflector is fixed.

10. The optical scanning device according to claim 1, wherein the substrate member is provided at an opposite side of the fixed wall with the rotary polygon mirror being interposed therebetween.

11. The optical scanning device according to claim 1, wherein the light source part includes:
a semiconductor laser that is configured to emit the laser beam, and
a coupling lens that converts the laser beam from the semiconductor laser into a parallel light flux.

12. The optical scanning device according to claim 1, wherein the reinforcing part is a protrusion that extends perpendicularly from the fixed wall.

13. The optical scanning device according to claim 1, wherein the second fixing part extends perpendicularly from the fixed wall, and
wherein the substrate member is screwed to the second fixing part.

\* \* \* \* \*